United States Patent [19]

Pernicka et al.

[11] Patent Number: 5,760,867
[45] Date of Patent: Jun. 2, 1998

[54] DOUBLE-HINGED ADJUSTABLE EYEGLASSES

[75] Inventors: Martin Pernicka; Raymond Cyr, both of Laval, Canada

[73] Assignee: Leader Industries Inc., Boucherville, Canada

[21] Appl. No.: 709,518

[22] Filed: Sep. 6, 1996

[30] Foreign Application Priority Data

Jul. 11, 1996 [CA] Canada ................... 2181020

[51] Int. Cl.⁶ ............... G02C 5/14; G02C 5/20; G02C 5/00
[52] U.S. Cl. ............... 351/120; 351/118; 351/149; 351/154
[58] Field of Search ............... 351/111, 118, 351/119, 120, 149, 154; 16/228

[56] References Cited

U.S. PATENT DOCUMENTS

| D. 347,648 | 6/1994 | Iida | D16/112 |
|---|---|---|---|
| 2,214,377 | 9/1940 | Markell | 351/149 |
| 3,212,102 | 10/1965 | Muller | 2/12 |
| 3,841,741 | 10/1974 | Vischer | 351/120 |
| 4,017,165 | 4/1977 | Davis | 351/153 |
| 4,367,929 | 1/1983 | Fortini | 351/119 |
| 4,527,291 | 7/1985 | Nussbickl | 2/450 |
| 4,544,245 | 10/1985 | Stansbury | 351/120 |
| 4,792,221 | 12/1988 | Parks | 351/120 |
| 4,843,655 | 7/1989 | Hegendörfer | 2/449 |
| 4,867,550 | 9/1989 | Jannard | 351/47 |
| 4,991,952 | 2/1991 | Grau | 351/120 |
| 5,033,837 | 7/1991 | Leonardi | 351/121 |
| 5,289,592 | 3/1994 | Paivarinta | 2/431 |
| 5,347,325 | 9/1994 | Lei | 351/118 |
| 5,381,192 | 1/1995 | Canavan | 351/118 |
| 5,387,949 | 2/1995 | Tackles | 351/121 |
| 5,457,505 | 10/1995 | Canavan | 351/120 |
| 5,638,147 | 6/1997 | Wang-Lee | 351/120 |

Primary Examiner—Huy Mai
Attorney, Agent, or Firm—Joseph W. Molasky & Associates

[57] ABSTRACT

An eyeglass construction is described and comprises a lens, a pair of lens engaging members, a pair of hinge members, and a pair of temple pieces. The hinge members are adapted to slidably engage the lens engaging members and to be connected therewith for pivotal movement about a horizontal axis. The pair of temple pieces each have a portion adapted to engage a hinge member and to be connected therewith for pivotal movement about a substantially vertical axis. The lens engaging member and the hinge member have cooperating angular positioning elements so that the members may be adjusted relative to one another to enable the lens to adopt various angular position relative to the temple pieces.

10 Claims, 5 Drawing Sheets

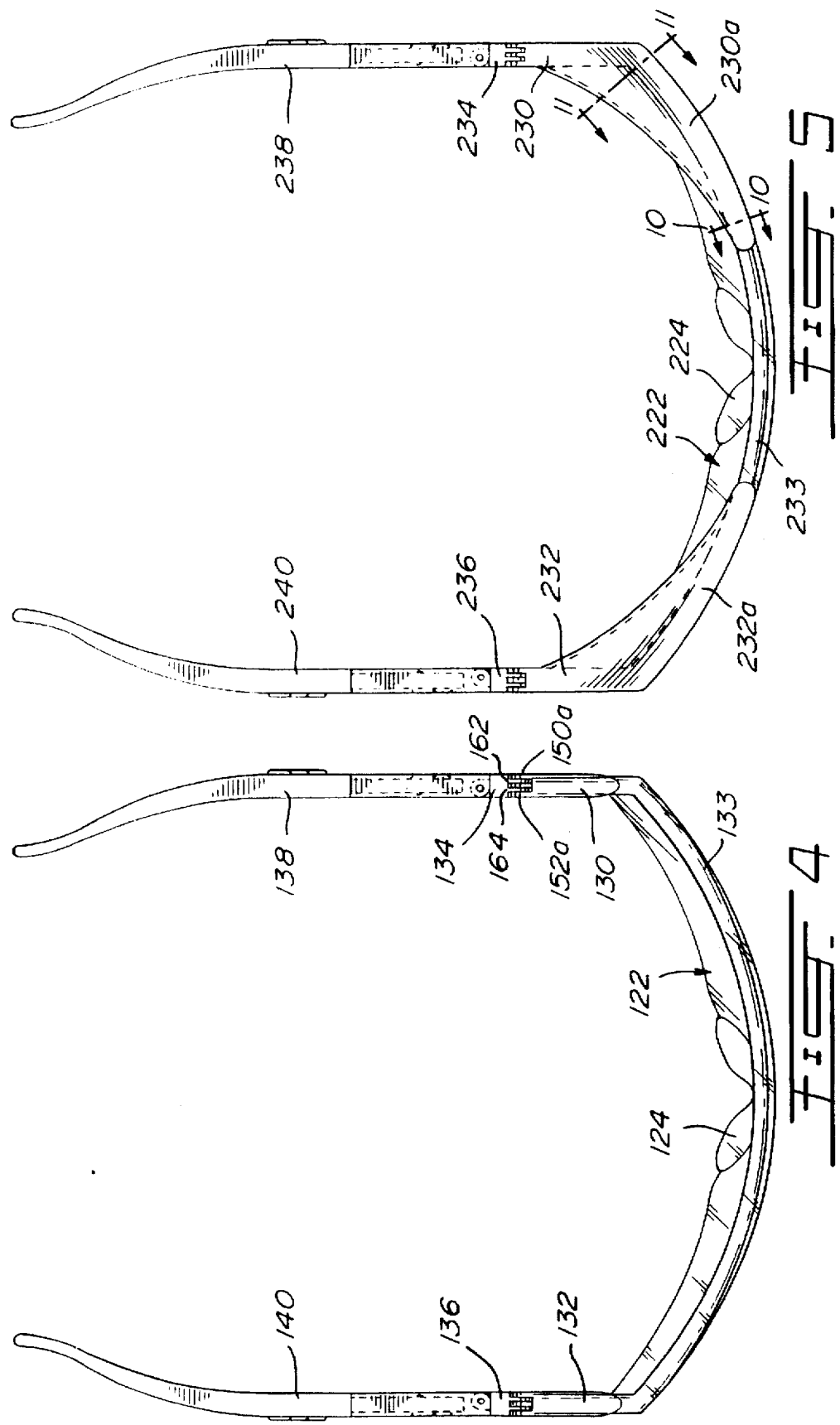

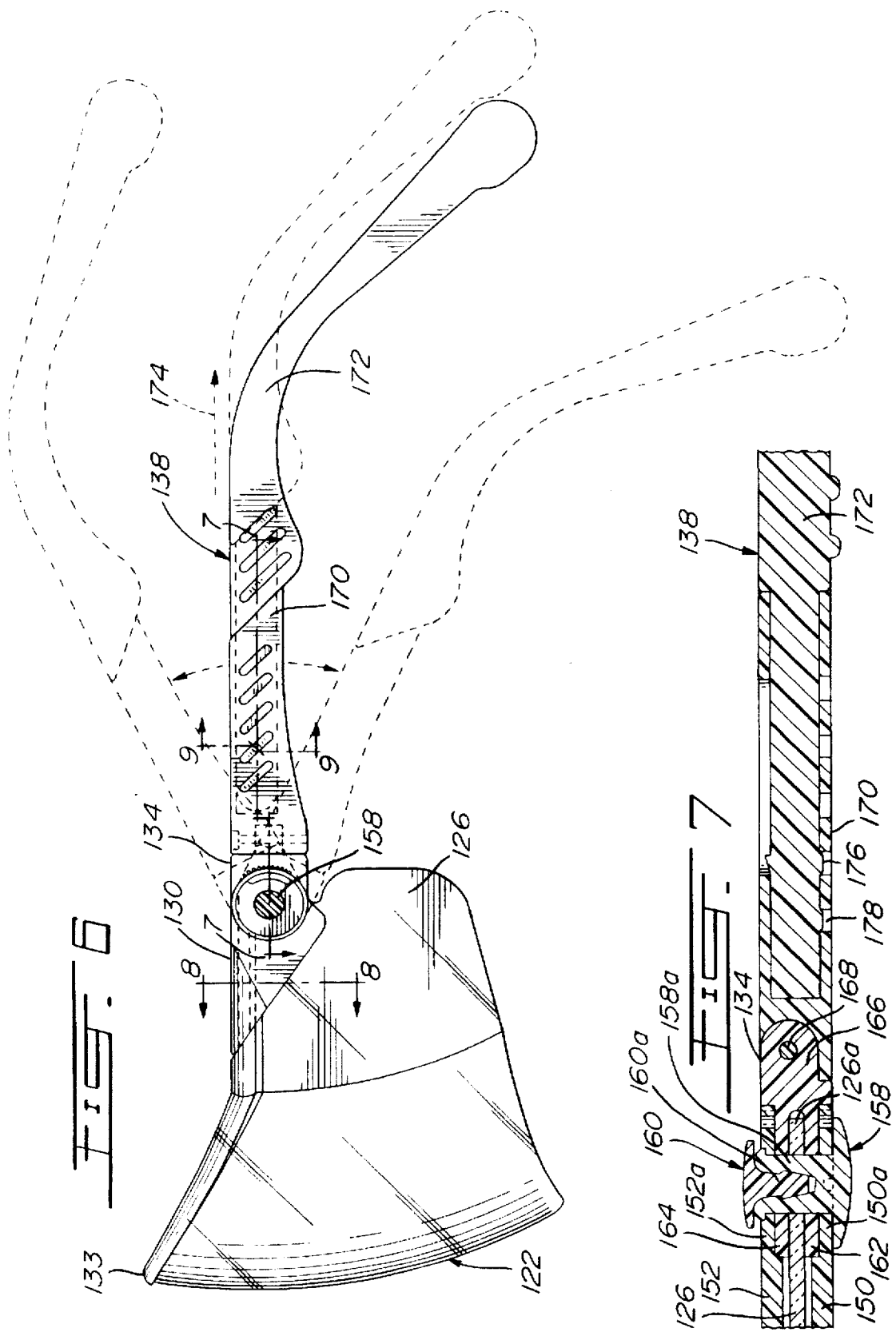

DOUBLE-HINGED ADJUSTABLE EYEGLASSES

FIELD OF THE INVENTION

The present invention pertains to an eyeglass construction consisting of a lens and of inter-connected members for mounting the lens to a pair of earstems.

BACKGROUND OF THE INVENTION

There are various types of eyeglass construction for protecting the eyes of wearers whether it be against the sun or during certain activities, hazardous or not. For example, a bicycle racer or user often has his head in an inclined position with respect to the horizontal vision level. Hence, it becomes preferable to be able to adjust the position of the lens so as to face at a better angle this horizontal vision level. Also, the size of one's nose dictates in some instances a lens positioning relative to the earstems.

One example of an eyeglass construction may be found described in U.S. Pat. No. 5,457,505 issued Oct. 10, 1995 to Canavan et al. This construction comprises a lens frame piece and a pair of temple frame pieces where the temple pieces are pivotally attached to the lens frame pieces to pivot about a vertical axis as well as about a horizontal axis. The eyeglass construction comprises an attachment bracket which extends forwardly and downwardly from the upper frame section of the lens frame piece; the bracket includes a detent for securing the lens piece thereto.

OBJECT AND STATEMENT OF THE INVENTION

It is an object of the present invention to provide an improvement eyeglass construction which consists of a series of inter-connected members, the engagement of a first of said members to the lens being so constructed as to facilitate the mounting of all inter-connected members to the lens.

This is achieved by providing a eyeglass construction which comprises:

a) lens having opposite sides;

b) a pair of lens engaging members each having a first portion configured to slidably engage, through endwise insertion, the lens at a respective one of the opposite sides, and a second portion defining a first hinge area;

c) a pair of hinge members each having a first portion adapted to slidably engage the hinge area of the second portion of the lens engaging member and to be connected therewith for pivotal movement about a substantially horizontal axis;

each hinge member having a second portion defining a second hinge area;

d) a pair of temple pieces each having a first portion adapted to engage the second hinge area of the second portion of the hinge member and to be connected therewith for pivotal movement about a substantially vertical axis whereby the temple pieces may be folded rearwardly of the lens frame piece; and e) angular positioning means on each lens engaging member and hinge member cooperating to angularly adjust, about the horizontal axis members relative to one another to thereby enable the lens frame piece to adopt various angular positions relative to the temple pieces.

In one embodiment of the eyeglass construction of the present invention, the lens engaging member is configured to engage only the sides of the lens. In a second embodiment, it engages a side and a portion of the top part of the lens while, in a third embodiment, it engages the entire upper edge of the lens. In all three embodiments, this is achieved by providing on the lens engaging member means which will enable an endwise sliding engagement. In the second and third embodiments the sliding engagement is followed by pressing down in a snap-in engagement the lens engaging member with another part of the lens frame.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 4 is a top plan view of the eyeglass construction shown in FIG. 2;

FIG. 5 is a top plan view of the eyeglass construction shown in FIG. 3;

FIG. 6 is a side elevational view of the embodiment illustrated in FIG. 2;

FIG. 7 is a cross-sectional view taken along lines 7—7 of FIG. 2;

DESCRIPTION OF PREFERRED EMBODIMENTS

Figure 1:
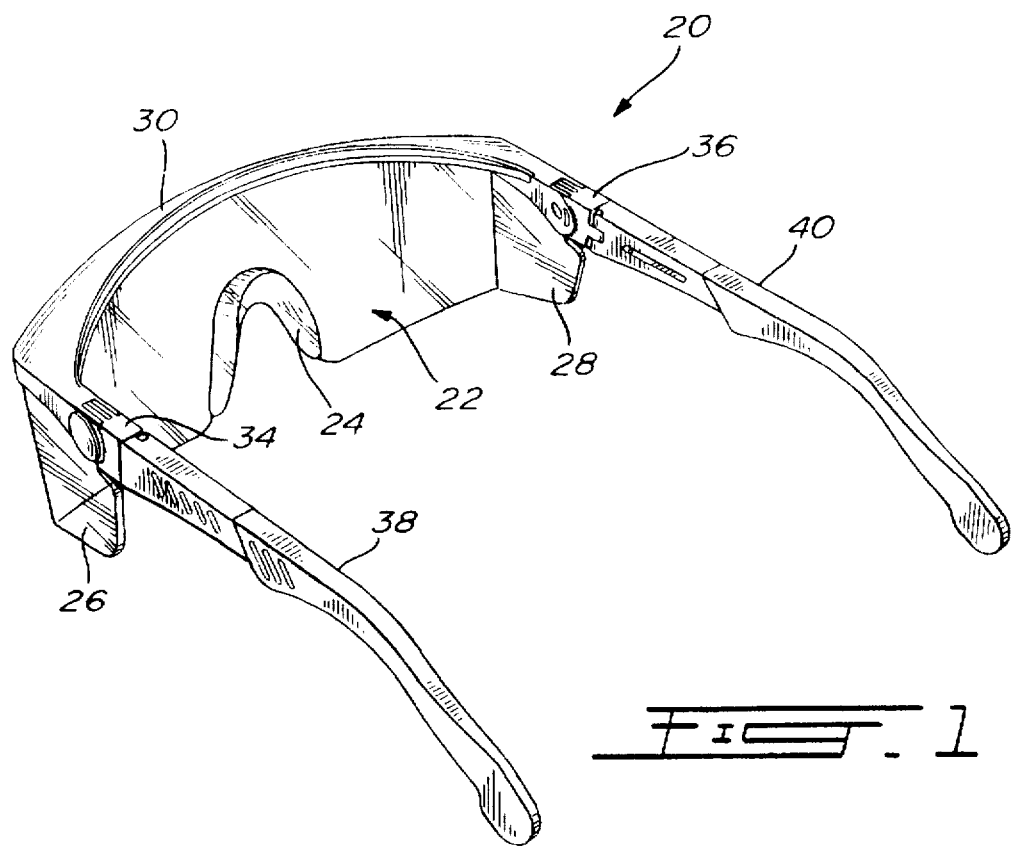
FIG. 1 is a perspective view of a first embodiment of an eyeglass construction made in accordance with the present invention.
Figure 3:
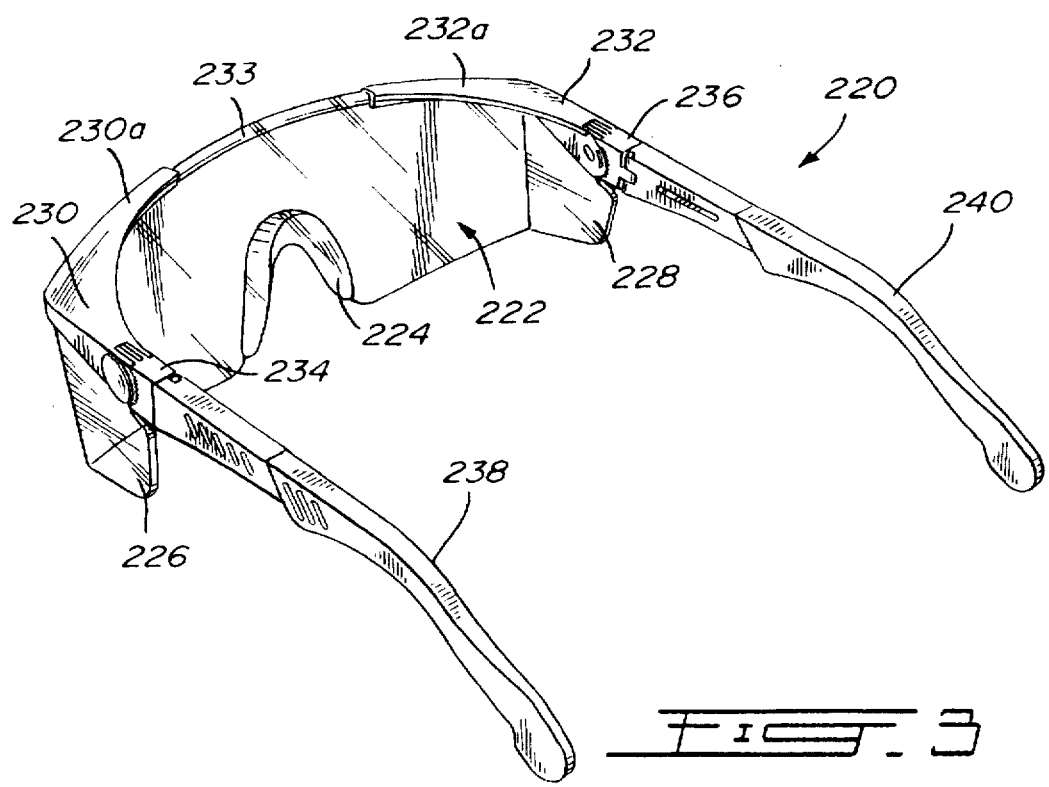
FIG. 3 is a perspective view of a third embodiment of an eyeglass construction made in accordance with the present invention.
Figure 2:
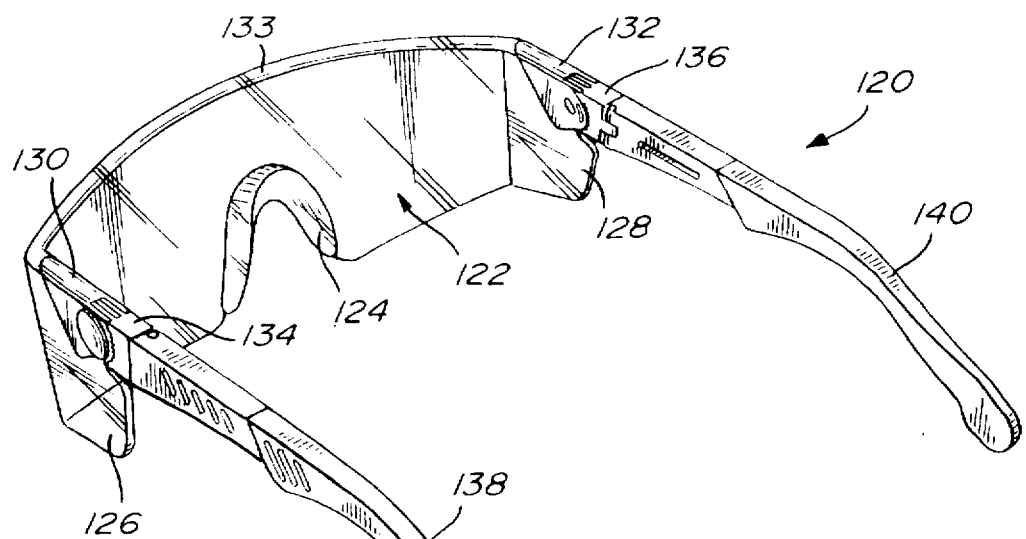
FIG. 2 is a perspective view of a second embodiment of an eyeglass construction made in accordance with the present invention.

Referring to FIGS. 1, 2 and 3 of the drawings, three protective eyeglass constructions 20, 120, and 220 are illustrated. Each construction comprises a lens 22, 122, 222, preferably having a nose piece 24, 124, 224, and including two opposite lens sides 26 and 28, 126 and 128, 226 and 228, respectively.

In the embodiment illustrated in FIG. 1, a lens engaging member 30 extends crosswise the upper edge of the lens 22 and terminates over the two opposite lens sides 26 and 28 while, in the embodiments illustrated in FIGS. 2 and 3 as well as FIGS. 4 and 5, there is provided a pair of lens engaging members 130 and 132, 230 and 232 mounted to parts of the upper edge 133, 233 of the lens 122, 222. In the embodiment illustrated in FIG. 2, the lens engaging members 130 and 132 extend over only the upper edge of the lens sides 126 and 128 while, in the embodiment illustrated in FIG. 3, the lens pieces 230 and 232 extends not only over the upper edge of the lens sides 226 and 228, but also over a short distance of the upper edge of the front part of the lens 222.

The three eyeglass constructions 20, 120, 220, each include a pair of opposite hinge members 34 and 36, 134 and 136, 234 and 236 to which are respectively mounted temple pieces 38 and 40, 138 and 140, 238 and 240. As detailed hereinbelow, each temple piece is formed of two sections, one being hingedly connected to a corresponding hinge member, the other being adapted to fit over a wearer's ear.

It is to be noted that the constructions of the pair of hinge members and of the temple pieces for all three embodiments 20, 120 and 220 are identical; therefore, a detailed construction of these hinge members and temple pieces will only be given for one embodiment and for one side of the eyeglass. On the other hand, the constructions of the lens engaging members 30, 130 (and 132) and 230 (and 232) vary due to the manner in which they fit to the upper edge 133, 233 of the eyeglass.

Referring to FIGS. 2, 2a, 4, 6, 7, 8 and 9, the present invention will be described in greater detail in connection with the eyeglass construction 122. The lens engaging member 130 is identically constructed to the lens engaging member 132; therefore, only one hinge member will be detailed.

Lens engaging member 130 defines an inverted U-shaped body (see FIG. 8) with a pair of opposite side portions 150 and 152, each having an internal rim 154, 156 that engages a correspondingly shaped groove 157 extending longitudinally on each opposite side of the upper edge 133 of the eyeglass. The mounting of member 130 to the lens is accomplished through an endwise sliding engagement of the member 130 onto the upper edge of the lens side 126 of the lens.

The end of sections 150, 152 (see FIG. 7) adjacent the hinge member defines a pair of rounded extensions 150a, 152a each having a transverse hole 153, 155 so as to allow the insertion of a hinge pin connection 158, 160 detailed hereinafter.

Figure 2A:
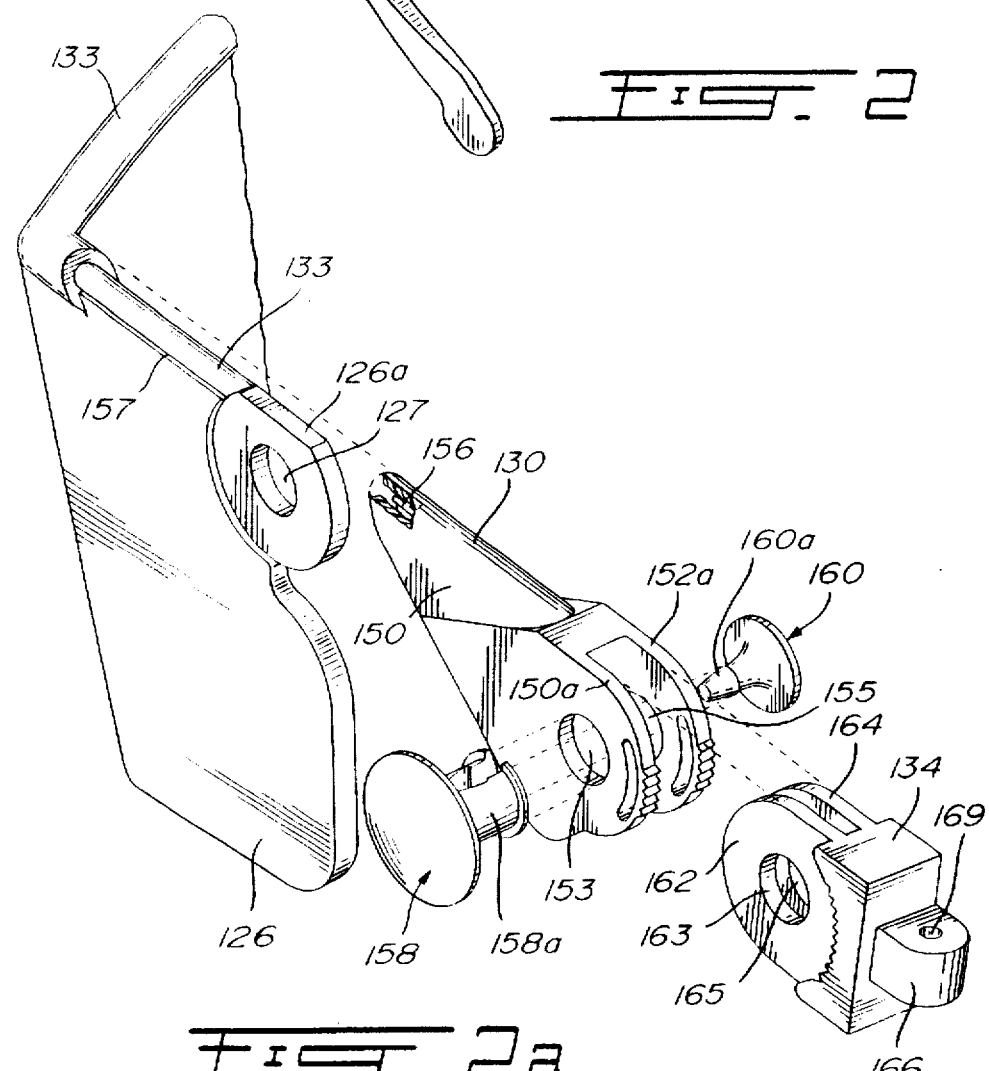
FIG. 2a a is an exploded view of one side of the eyeglass construction of FIG. 2.
Figure 8:
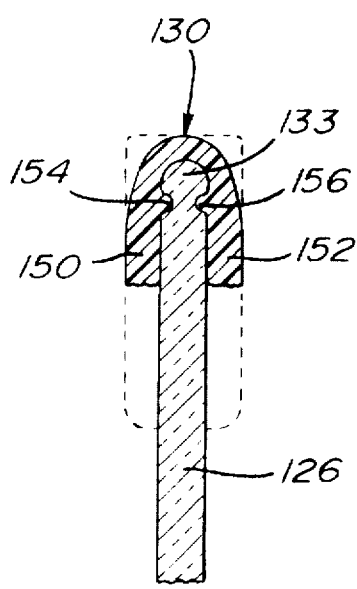
FIG. 8 is a cross-sectional view taken along lines 8—8 of FIG. 6.
Figure 9:
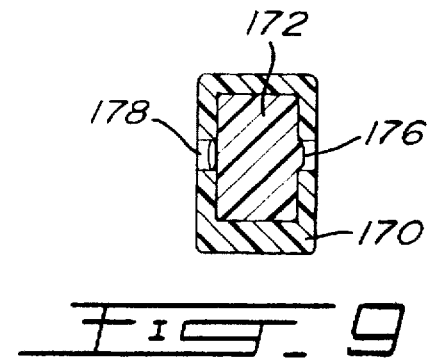
FIG. 9 is a cross-sectional view taken along lines 9—9 of FIG. 6.

Referring to FIG. 2a, the hinge member 134 also includes a pair of rounded extensions 162 and 164 that snugly fit between the extensions 150a and 152a of the lens engaging member as well as the rounded upper end 126a of the lens side 126. Extensions 162 and 164 also each include a hole 163, 165 that comes into registry with the holes 153, 155 of extensions 150a and 152a as well as with the hole 127 provided in the extremity 126a of the lens side 126 so that the pair of pins 158, 160 of the hinge connection may be inserted through these holes to secure the three components together. The engagement of the hinge pins 158 and 160 is accomplished by first inserting pin 158 through holes 153, 163, 127, 165, 155 all in axial registry and thereafter inserting pin extension 160a into hollow extension 158a of pin 158 whereby the parts inter-connect through a snap engagement.

As also illustrated in FIG. 6, the hinge pin arrangement 158, 160 allows the temple piece 138 to pivot about a horizontal axis extending centrally through the holes. The hinge member 134 has, opposite this horizontal axis, an extension 166 having a vertical hole 169 to receive a pin 168 so as to define a vertical axis allowing the temple piece 138 to pivot in a horizontal plane.

The temple piece 138 comprises two sections 170, 172 which telescopically engage one another to provide longitudinal adjustment as illustrated by arrow 174. Section 172 displays a series of small projections 176 that engage associated small openings 178 in the other section 170 (see FIG. 9).

Figure 10:
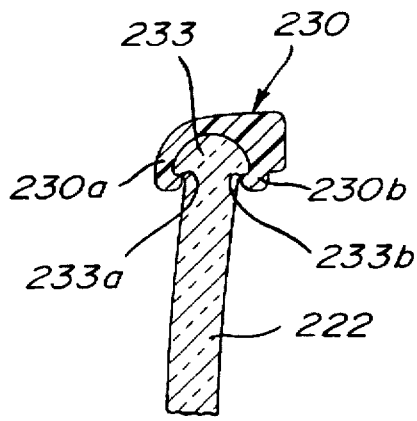
FIG. 10 is a cross-sectional view taken along lines 10—10 of FIG. 5.
Figure 11:
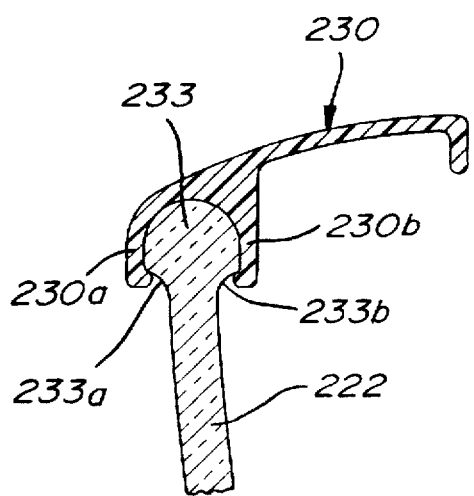
FIG. 11 is a cross-sectional view taken along lines 11—11 of FIG. 5.

Referring to the embodiment illustrated in FIG. 5, the construction of the lens engaging members 230 and 232 is identical to the construction of the lens engaging members 130 and 132 of FIG. 4, with one exception, in that these members include a frontward projection 230a, 232a that extends over part of the upper edge 233 of the lens. Referring also to FIGS. 10 and 11, the upper edge 233 of the lens 222 is constructed somewhat differently from that of the upper edge of the side lens 226. Indeed, the upper edge 233 comprises only a bulging upper area so that the downwardly side projections 230a and 230b of the lens engaging member, being made of resilient material, may be snapped into engagement under the opposite shoulder areas 233a and 233b of the edge 233. Hence, in this embodiment, for assembling the eyeglass, the lens engaging members are first slidably engaged in an endwise manner (as described above) with respect to the lens engaging members 130 and 132; then, this is followed by a snap-down engagement of the extensions 230a and 232a to the upper edge 233 of the lens.

Concerning the embodiment illustrated in FIG. 1, it is believed not to be required to provide a detailed construction of the lens engaging member 30 since the portion engaging the upper edge of the entire front part of the lens 22 is a prolongation of the two side extensions 230a and 232a of the embodiment illustrated in FIG. 3. Similarly, the engagement of the lens engaging member 30 is accomplished by first causing an endwise sliding engagement of those portions extending over the lens sides 26 and 28 and then this is followed by downward pressing engagement to snap the front part of the lens engaging member to the front upper edge of the lens 22.

Due to various snap-in engagements of some of the components of the present eyeglass construction, it is preferable to have these components made of resilient material, such as plastics.

Although the invention has been described above with respect to three forms, it will be evident to a person skilled in the art that it may be modified and refined in various ways. It is therefore wished to have it understood that the present invention should not be limited in interpretation, except by the terms of the following claims.

The embodiments of the invention in which an exclusive property or privilege is claimed are defined as follows:

What is claimed is:

1. An eyeglass construction comprising:

a) a lens having opposite sides and an upper edge surface;

b) a pair of lens engaging members, each lens engaging member having a first portion configured to slidably engage, through endwise insertion, the upper edge surface of said lens at a respective one of said opposite sides, and a second portion defining a first hinge area;

c) a pair of hinge members, each hinge member having a first portion adapted to slidably engage said first hinge area of said second portion of said lens engaging member and to be connected therewith for pivotal movement about a substantially horizontal axis, each said hinge member having a second portion defining a second hinge area;

d) a pair of temple pieces, each temple piece having a first portion adapted to engage said second hinge area of said second portion of said hinge member and to be connected therewith for pivotal movement about a substantially vertical axis whereby said temple pieces may be folded rearwardly of said lens; and e) angular positioning means on each said lens engaging member and hinge member cooperating to angularly adjust, about said horizontal axis, said members relative to one another to thereby enable said lens to adopt various angular positions relative to said temple pieces.

2. An eyeglass construction as defined in claim 1, wherein said opposite sides of said lens and said first portion of said lens engaging members have interengaging complementary projections and grooves to enable said endwise insertion of said lens engaging members to said lens.

3. An eyeglass construction as defined in claim 2, wherein both said members are made of resilient thermoplastics material.

4. An eyeglass construction as defined in claim 3, wherein said first portions of said lens engaging members include a first part slidably engageable with the upper edge surface of said lens at the opposite ends thereof, and a second part engageable with a separate area of said upper edge surface of said lens through a snap-in engagement.

5. An eyeglass construction as defined in claim 4, wherein said second parts of said lens engaging members extend across the upper edge surface of said lens for a distance sufficient to define a unitary part that extends crosswise the entire upper edge surface of said lens.

6. An eyeglass construction as defined in claim 3, wherein said angular positioning means consist of a pair of arcuate ribbed surfaces on said lens engaging members and on said hinge members respectively.

7. An eyeglass construction as defined in claim 6, wherein said lens engaging member includes slot means adjacent said arcuate surfaces to assist in the angular positioning of both said members relative to one another.

8. An eyeglass construction as defined in claim 1, wherein said lens, said lens engaging members and said hinge members define horizontally aligned holes when assembled; said construction including pivot pin means engaging said holes.

9. An eyeglass construction as defined in claim 1, wherein each said temple piece consists of two telescopically engaged sections; a first of said sections including said first portion of said temple piece hingedly connected to said hinge member to pivot about said vertical axis.

10. An eyeglass construction as defined in claim 9, further including means for adjusting the positions of said telescopically engaged sections relative to one another.

* * * * *